United States Patent [19]
Knox et al.

[11] Patent Number: 5,649,073
[45] Date of Patent: Jul. 15, 1997

[54] AUTOMATIC CALIBRATION OF HALFTONES

[75] Inventors: Keith T. Knox, Rochester, N.Y.; Charles M. Hains, Altadena, Calif.; Gaurav Sharma, Raleigh, N.C.

[73] Assignee: Xerox Corporation, Stamford, Conn.

[21] Appl. No.: 579,962

[22] Filed: Dec. 28, 1995

[51] Int. Cl.$^6$ ................................................. H04N 1/405
[52] U.S. Cl. ...................... 395/109; 358/298; 358/456; 358/458
[58] Field of Search .................... 395/109; 358/298, 358/456, 457, 458, 460, 406, 534, 535, 536, 504; 382/237

[56] References Cited

U.S. PATENT DOCUMENTS

| | | | |
|---|---|---|---|
| 4,149,194 | 4/1979 | Holladay | 358/298 |
| 5,416,613 | 5/1995 | Rolleston et al. | 358/504 |
| 5,457,541 | 10/1995 | Burns | 358/298 |
| 5,463,472 | 10/1995 | Neuhoff et al. | 358/298 |
| 5,469,267 | 11/1995 | Wang | 358/298 |
| 5,473,439 | 12/1995 | Pappas | 358/298 |
| 5,508,826 | 4/1996 | Lloyd et al. | 358/504 |

OTHER PUBLICATIONS

R. Floyd and L. Steinberg, "An adaptive algorithm for spatial grey scale," Proc. SID, vol. 17/2, 1976 pp. 75–77.

T. Papas, C.-K. Dong and D. Neuhoff, "Measurement of printer parameter for model-based halftoning", J. Elect. Img., vol. 2/3, 1993, pp. 193–204.

C. Rosenberg, "Measurement-based evaluation of a printer dot model for halftone algorithm tone correction," J. Elect. Img., vol. 2/3, 1993, pp. 205–212.

Clapper et al., "The Effect of Multiple Internal Reflections on the Densities of Half-Tone Prints on Paper" Jnl. Opt. Soc. of Am., vol. 43, No. 7, 1953, pp. 600–603.

Ruckdeschel et al. "Yule-Nielsen Effect in Printing: a physical analysis", Applied Optics, vol. 17, No. 21, Nov., 1978 pp. 3376–3383.

A. Murray, "Monochrome Reproduction in Photo-Engraving", Journal of the Franklin Institute, vol. 221, Nos. 1321–1326, pp. 721–744(1936).

J.A.C. Yule, et al., "The Pentration of Light into Paper and its Effect on Halftone Reproduction", TAGA Proc. 3, pp. 65–76 (1957).

*Numerical Recipes in C*, W. H. Press, et al., Cambridge University Press, pp. 60–71 (1988).

*Primary Examiner*—Scott A. Rogers
*Attorney, Agent, or Firm*—Mark Costello

[57] ABSTRACT

A calibration system, for calibrating a printer response to halftone images directed thereto, includes a test pattern, stored in a memory, providing a plurality of samples of combinations of printed spots, printable on a media by the printer; a gray measuring device, to derive a gray measurement of the samples of printed spots; a calibration processor correlating gray measurements with a particular combination of spots, and deriving parameters describing the printer response to the particular combination; generating at least one gray image correction, including a set of correction values selected in accordance with said the described printer response, and a calibration memory, storing the generated halftone patterns.

11 Claims, 5 Drawing Sheets

AUTOMATIC CALIBRATION OF HALFTONES

FIELD OF THE INVENTION

The present invention is directed to calibration of gray reproduction levels for use in printers based upon printer response to the halftone input, and more particularly to a simplified method of calibration that uses a printer model to limit the number of variables required for the calibration process.

BACKGROUND OF THE INVENTION

Common digital printer technology, such as that noted, for example in the Xerox DocuTech Printing System, reproduce variations in gray density by printing larger and smaller numbers of spots or pixels within a unit area. The decision to print a spot within a unit area is based upon a comparison of the required shade of gray with one of a set of predetermined threshold levels. If the gray is darker than a given threshold level, a spot is printed. If the gray is not as dark as a given threshold level, a spot is not printed. A set of thresholds, hereinafter referred to as a halftone cell or dot, include a plurality of different values against which comparisons can be made. The halftoning process is described in more detail in U.S. Pat. No. 4,149,194 to Holladay.

To print an image using a given halftone dot, the dot must be calibrated for a particular or target printer. Calibration refers to setting the threshold values of the halftone cell so that a given input gray is well represented by the printed image. Currently, this calibration is a slow and laborious process that has to be repeated for every halftone dot that one wants to use. The calibration will remain valid as long as the printer characteristics do not change. Because of the large effort required to calibrate a given halftone dot, the creation and use of new halftone dots is difficult and therefore seldom done. However, it is well understood that desirable effects and improved printing results can be obtained by using different dots in the image. Also different printers will have different calibrations for the same halftone dot, making it unfeasible to prepare halftoned images to be printed remotely with guaranteed tone reproduction.

The same calibration difficulty applies to other gray reproduction schemes or halftoning algorithms which are adaptive and do not use a set of fixed thresholds, such as error diffusion, pulse density modulation, and least squares model-based halftoning. This difficulty also applies to specialized bitmap patterns, sometimes generated from special halftone dots, called tint dots. These specialized bitmap patterns are used to represent uniform gray patches with periodic or quasi-periodic arrangements of binary pixels that give the illusion of a gray region. In all of these cases, the problem is to calibrate the printed patterns in a manner in which they give a visual impression of the proper gray level from the input gray image that they are supposed to represent.

See also, R. Floyd and L. Steinberg, "An adaptive algorithm for spatial grey scale," Proc. SID, Vol. 17/2, 1976 pp. 75-77, and T. Pappas, C-K. Dong and D. Neuhoff, "Measurement of printer parameter for model-based halftoning," J. Elect. Img., Vol. 2/3, 1993, pp. 193-204, and C. Rosenberg, "Measurement-based evaluation of a printer dot model for halftone algorithm tone correction," J. Elect. Img., Vol. 2/3, 1993, pp. 205-212.

The effects of light scattering in paper can be found in, Clapper et al., "The Effect of Multiple Internal Reflections on the Densities of Half-Tone Prints on Paper" Jnl. Opt. Soc. of Am., Vol 43, No. 7, 1953, pp. 600-603. Also, Ruckdeschel et al. "Yule-Nielsen Effect in Printing: a physical analysis", Applied Optics, Vol. 17, No. 21, November, 1978 pp. 3376-3383.

SUMMARY OF THE INVENTION

In accordance with the invention there is provided a method and apparatus for calibrating gray reproduction schemes for use in a printer, wherein the calibration fits a model of the printing process to measurements from a limited set of test patterns.

In accordance with one aspect of the invention, there is provided a calibration system, for calibrating a printer response to gray images directed thereto, including: a test pattern, stored in a memory, providing a plurality of samples of combinations of printed spots, printable on a media by said printer; a gray measuring device, to derive a gray measurement of said samples of printed spots; a calibration processor: correlating said gray measurement with a particular combination of spots, and deriving parameters describing said printer response to said particular combination; generating at least one gray image correction, from a gray reproduction scheme and said parameters said gray image correction including a set of correction values selected in accordance with said described printer response, and a calibration memory, storing said generated halftone patterns. In one embodiment, the gray measuring device can be either a scanner or a densitometer or a colorimeter.

A two step process determines the proper threshold levels for any halftone dot for the purpose of calibrating the dot for any given printer. In a first step, the printer is characterized by printing and analyzing test patterns, and fitting a printer model to the measured responses of the printer. This characterization is independent of any halftone dot structure, screen frequency, or halftoning algorithm. In a second step, the model predicts the tone response of the halftone dot, or halftoning algorithm, based on the model parameters and the set of bitmap patterns, generated by halftoning uniform patches of differing input gray levels. In this way, all halftone dots and halftoning algorithms can be automatically calibrated from a single characterization of the printer.

This invention separates the calibration of the halftone dot or halftoning algorithm from the calibration of the printer. By the use of a model which predicts the tone response of the printer to the halftone dot, it is possible to calibrate the halftone dot for the printer without printing any test patterns that specifically use that halftone dot. This means that a graphic designer can freely design and use a halftone dot without having to calibrate the printer for that specific halftone. This is not true of printers that are calibrated by conventional means.

The calibration of the printer fits a model of the printing process to measurements from a set of test patterns. The model takes into account the overlap of neighboring pixels and the effect of light scattering in the paper. It may include 17 parameters that multiply functions calculated from the test patterns. The parameters are fit to the measurements of the test patterns by a relaxation method, such as least squares.

Once the printer has been calibrated, the response for any texture pattern can be predicted from the model. Each halftone dot will have its own characteristic texture patterns, which change as a function of gray level. The model can predict from the different arrangements of the texture patterns what the output average reflectance will be. From the threshold matrix, one can determine how the patterns change as a function of gray level.

The halftone dot is calibrated by inverting the tone response of the printer to the halftone dot. Ordinarily the tone response is measured using patterns made from a given halftone dot. In this invention, the model predicts the tone response from the printer parameters and matrix of thresholds levels that form the halftone cell. Therefore, the halftone dot can be calibrated from a generic printer calibration, without running a separate calibration specifically designed for that halftone dot. In addition, only a limited number of parameters are required to characterize the printer tone reproduction. This makes the printer characterization easy to transmit remotely in a distributed printing system.

The calibration's usefulness is not limited to standard halftoning, but is also applicable to other gray simulation schemes such as error diffusion or random halftoning. In such cases the image gray values are changed instead of changing the thresholds. A common method for changing the image gray values is by using a lookup table, which maps the input gray values to new values that apply the desired correction values.

These and other aspects of the invention will become apparent from the following descriptions to illustrate a preferred embodiment of the invention read in conjunction with the accompanying drawings in which.

Figure 3:
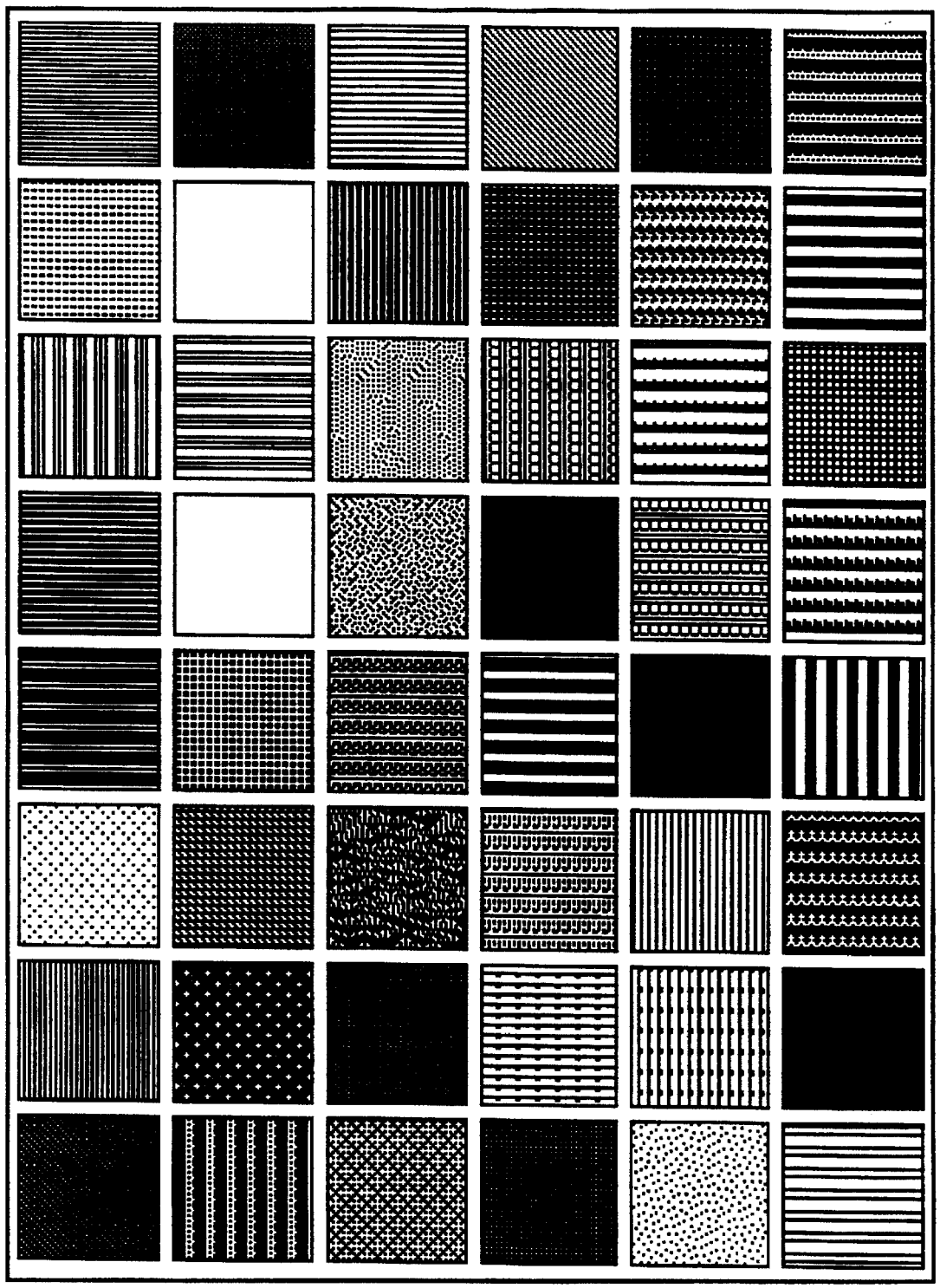
Figure 4:
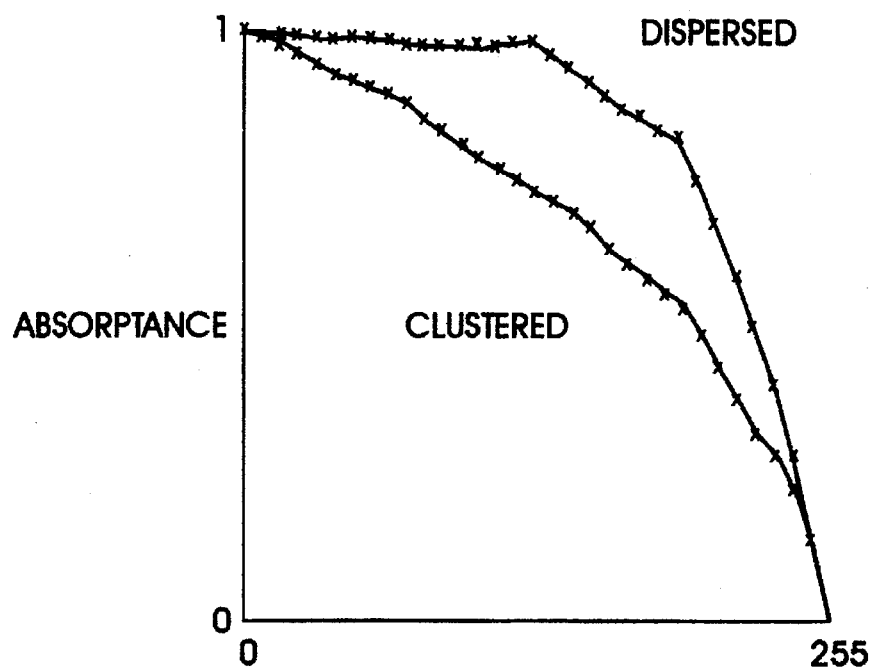
Figure 5:
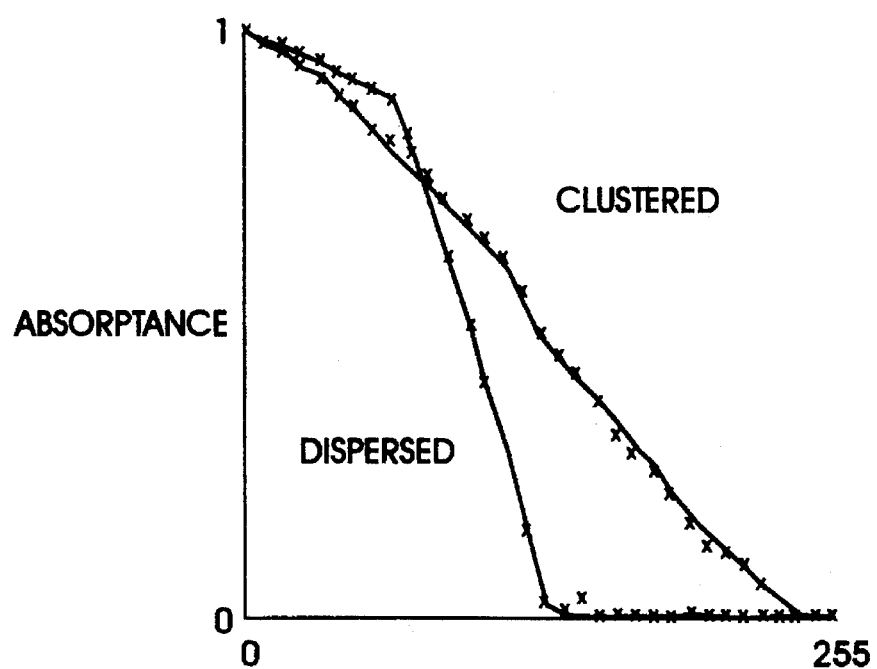
Figure 6A:
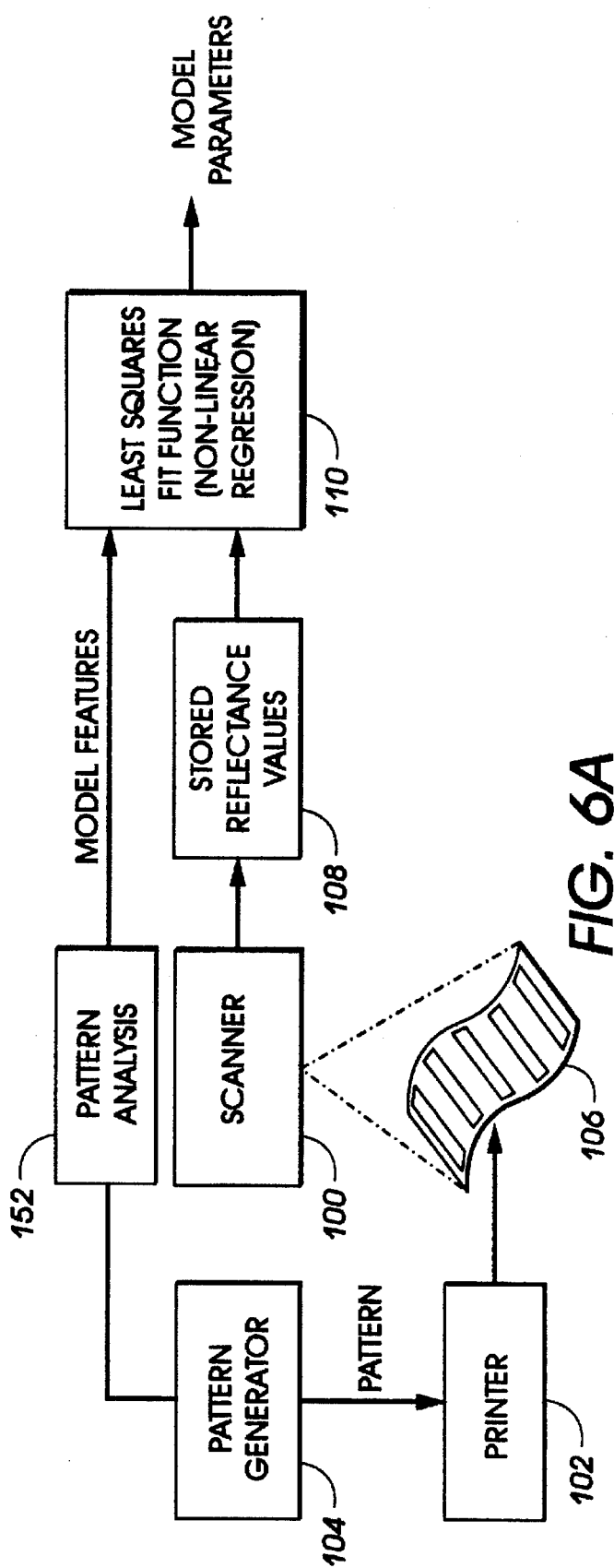
Figure 6B:
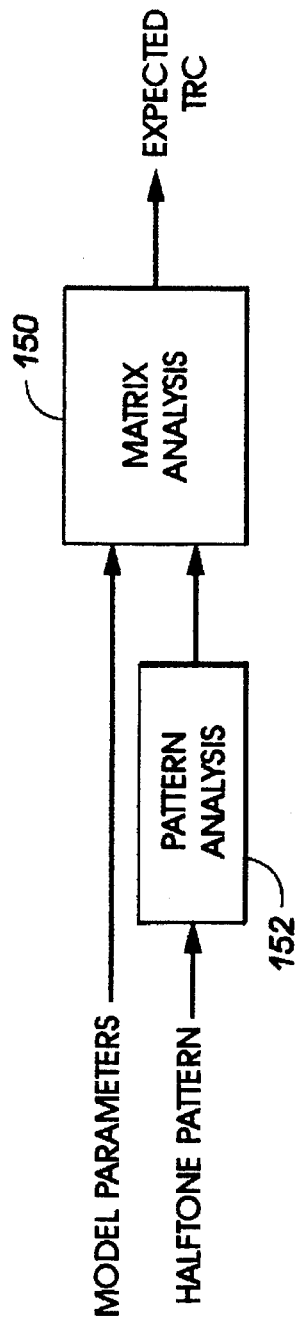

FIG. 3 illustrated a set of test patterns selected to demonstrate printer response to a variety of spot spatial configurations;

FIGS. 4 and 5 illustrate model predictions for selected white write and write black printers, respectively, comparing with actual measurements; and FIGS. 6A and 6B are a schematic illustration of the inventive calibration process.

DETAILED DESCRIPTION OF THE INVENTION

Referring now to the drawings where the showings are for the purpose of describing an embodiment of the invention and not for limiting same, initially, the principal of the invention will be discussed.

In accordance with one aspect of the invention, a new tone reproduction model is described herein. Although the model is empirical, with parameters that are fit to a measured response of the printer, the choice of the relevant parameters was determined from theoretical grounds. The model starts from the Murray-Davies equation, extended by the circular dot overlap model, then non-linear fitting parameters are included to account for the Yule-Nielson effects of the scattering of light in paper. For a further description of the Murray Davies equation and the Yule-Nielsen effects of the scattering of light in paper, see, A. Murray, "Monochrome Reproduction in Photo-Engraving", Journal of the Franklin Institute, Vol. 221, Nos. 1321–1326, pp. 721–744 (1936); and J. A. C. Yule, et al., "The Penetration of Light into Paper and its Effect on Halftone Reproduction", TAGA Proc. 3, pp. 65–76 (1957).

A linear model of the reflectance of a halftone dot is given by the Murray-Davies equation. For a halftone cell with two regions, one region in which the paper is completely covered with toner or ink and a second region that is left as white paper, average reflectance of a halftone pattern, R, is given by the sum of the reflectance's of the two regions:

$$R = (1-a)R_w + aR_b,$$

where a is the fractional area of the halftone dot that is covered with toner, $R_w$ is the reflectance of the white paper, and $R_b$ is the reflectance of the area covered with black toner. In a digital halftone cell, the fractional area that is black is given by the ratio of the number of black pixels to the total number of pixels within the halftone cell. Usually, one normalizes the reflectances so that the reflectance of white paper is 1.0 and the reflectance of solid area toner is 0.0. In addition, if one considers the absorptance, given be $A = 1-R$, then the Murray-Davies equation becomes:

$$A = a = n/N,$$

where n is the number of black pixels in the halftone cell; and

N is the total number of pixels in the same cell.

Figure 1:
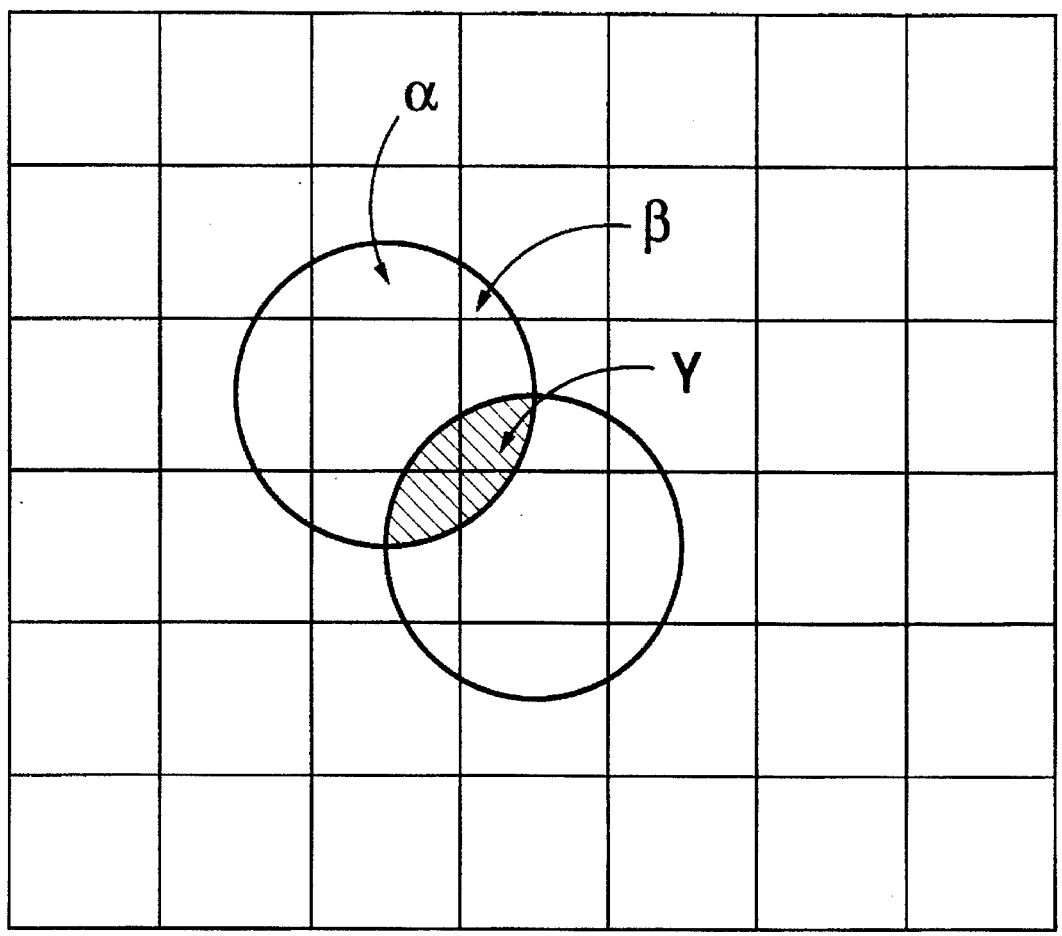
FIG. 1 shows the circular dot model of printing, described below.

A circular dot overlap model extends this definition to include the overlapping areas of the circular pixels each centered on a rectangular grid. The overlapping areas can be defined in terms of the three features shown in FIG. 1, labeled alpha, beta and gamma. For the case when a printer produces large, oversized black pixels, as shown in FIG. 1, the absorptance is larger than the amount predicted from just counting the number of black pixels. The overlap regions add to the absorptance if they extend into a white pixel. If they overlap a neighboring black pixel, then they have no effect. Underlying this is the assumption that the amount of black toner put on the paper is at saturation, so that black printed over black gives no increase in density.

Oversize pixels result from writing with an oversized brush. Depending on which type of printer is used, a write-black or a write-white printer, the circular dot overlap model will describe either oversize black or oversize white pixels. The circular dot model described above and in the literature is for write-black (Discharge Area Development) systems. This invention applies to write-white (Charged Area Development) printers as well.

Figure 2:
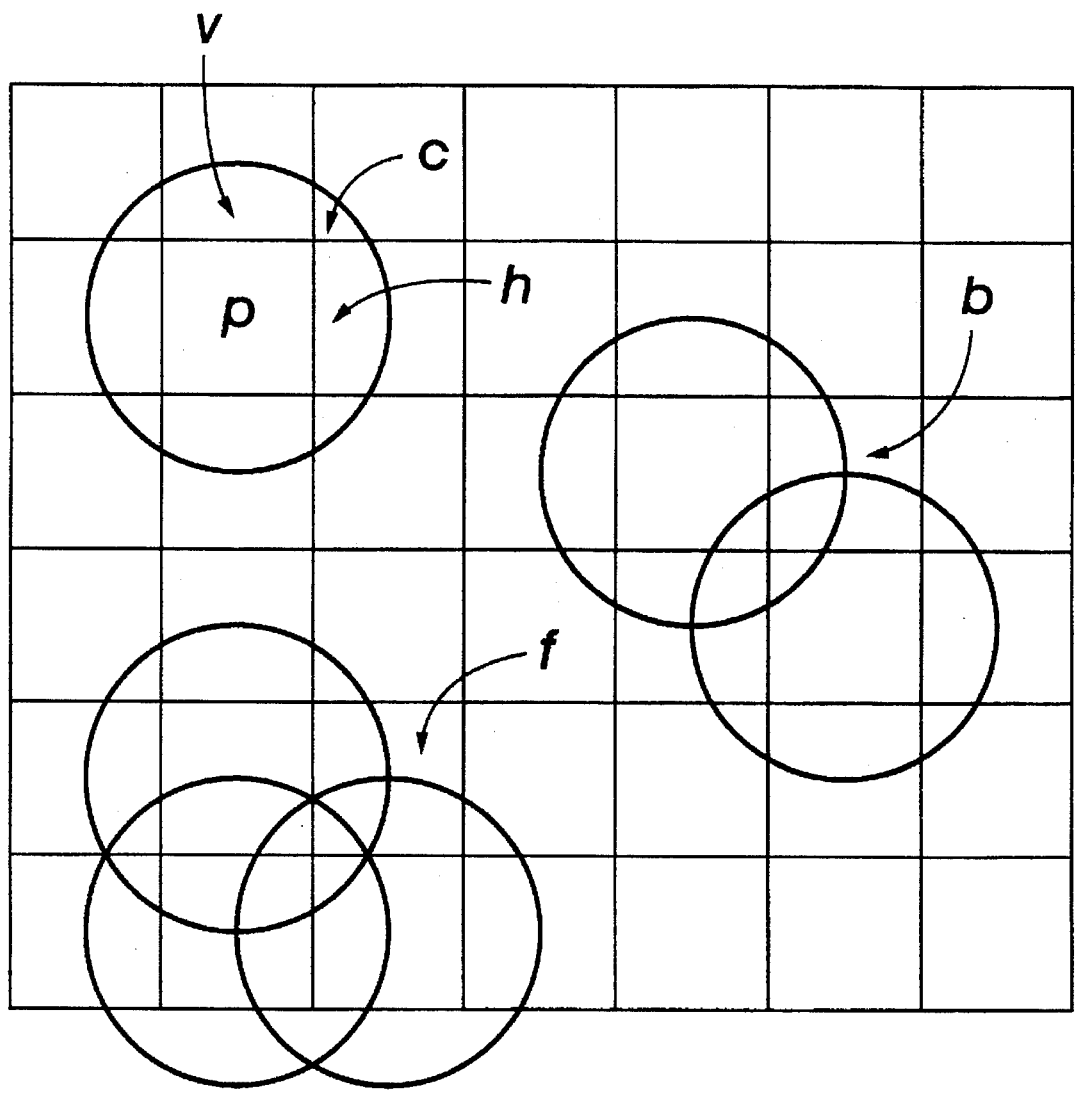
FIG. 2 shows the expanded set of parameters used in describing the present model of printing.

In the new printer model, six features are defined. They are named "pixels", "horizontal sides", "vertical sides", "corners", "fillets" and "bridges" and are illustrated in FIG. 2. A "pixel" is the number of black pixels within the cell. The number of sides, corners, fillets and bridges depends on the configuration of the black pixels within the cell. The "sides" (labeled v and h), "corners" (c), and "fillets" (f) features correspond directly to the alpha, beta and gamma features of the standard circular dot overlap model shown in FIG. 1. The "bridges" (b) feature is new, and included to extend the model to write-white printers. As will be discussed, parameters are fit to the equation defining the model and the addition of the "bridges" parameters allows both types of printers to be characterized without changing the set of test patterns or how they are treated.

The first step in analyzing a pattern is to calculate the values of the six features from a bitmap pattern. The number of black pixels is apparent. A side is an edge that separates a black pixel from a white pixel. The sides of adjacent black pixels overlap and add nothing to the total absorptance. A side is horizontal if the white pixel and a black pixel are horizontally adjacent, and vertical if vertically adjacent. A black pixel can have as many as four corners. A corner is counted if it is adjacent to three connected white pixels. A fillet is the indentation in a group of three black pixels. It consists of a corner of a white pixel surrounded by three connected black pixels. A bridge is the intersection of two black pixels that touch diagonally.

The six features of the model can be calculated for any pattern. The model represents the absorptance, $A_i$, of pattern i, as a linear combination of these features and cross products of them. The additional non-linear cross products are included in the model to take into account the effects of light scattering in the paper. Mathematically, the expression for the absorptance of the pattern becomes:

$$A_i = \alpha_1 p_i + \alpha_2 h_i + \alpha_3 v_i + \alpha_4 c_i + \alpha_5 f_i + \alpha_6 b_i + \alpha_7 p_i^2 + \alpha_8 h_i^2 + \alpha_9 v_i^2 + \alpha_{10} c_i^2 + \alpha_{11} f_i^2 + \alpha_{12} b_i^2 + \alpha_{13} p_i h_i + \alpha_{14} p_i v_i + \alpha_{15} p_i c_i + \alpha_{16} p_i b_i + \alpha_{17} p_i f_i \quad (1)$$

Note that not all possible cross terms are included in equation 1, i.e., some cross terms have been ignored. The "pixels" term is large compared to the other terms, so only cross terms that contain the d"pixels" term have any significance, for most cases. If other cross terms are significant for other specific cases, they can be easily included, causing only a slight increase in the number of parameters.

This model can be used in two modes. The first mode is the characterization or calibration of a printer, in which the parameters, $\alpha_1$ to $\alpha_{17}$ are fitted to the measured responses of the printer to a set of test patterns. The second mode is the prediction of the response of a given halftone dot to a printer using the printer parameters and the halftone dot pattern.

The calibration of a printer involves fitting the model to a set of measured responses of the printer. The fit will produce estimates of the $\alpha_1$–$\alpha_{17}$ parameters in the above equation. The parameters can be saved and used later to predict the tone response of that printer to any halftoning input.

To calibrate the printer, a set of test patches must be printed and measured. As illustrated in FIG. 3, a set of 45 patterns were designed to exercise the model space (in the illustration, we repeat white and black). Other sets of patterns are possible. Some experiments derived the set of patterns used from a set of four different halftone cells with 33 levels each, the total set containing 132 patterns.

To measure the reflectance of the patches, the printed patches are scanned and the resulting gray signal files are averaged to produce an average reflectance of each patch. Alternatively, this measurement can be made using a densitometer. At least two of the patches in the set are white and solid black. All of the reflectance measurements are normalized by subtracting the average reflectance of the black patch and dividing by the difference of the reflectances of the white and black patches. Finally, the normalized reflectances are subtracted from unity to produce a normalized absorptance. These normalized absorptances can also be thought of as measuring the amount of area coverage, which the model is trying to predict.

The model and the measurements take the following form:

$$A = Mx \quad (2)$$

where

M is a matrix of features calculated from the bitmaps for each patch, x is the vector of parameters that will be determined, and A is a vector of measured absorptances.

The number of test patches (45) is larger than the number of parameters to be determined (17), so a least squares fit can be done on the measured values to determine the parameters vector x.

Matrix M, has as many rows as there are test patterns and as many columns as there are parameters. For our case, that makes the matrix M to be 45 rows by 17 columns. Each row corresponds to the features calculated from the bitmap of one individual pattern. The features are included in matrix M, in the order shown in equation 1. The values for pattern i in equation 1, correspond to row i, in matrix M. The least squares solution to equation 2 is given by:

$$x = (M^T M)^{-1} M^T A \quad (3)$$

The calculation of the matrix terms in equation 3 does not represent a problem, unless the square matrix ($M^T M$) is singular. If that is the case, then its determinant is zero and the inverse cannot be calculated. If the matrix is near singular, then an answer can be calculated, but the result will vary wildly in response to small noise perturbations in the measurement vector, A. The way around the singularity problem is to use the pseudoinverse, which is based on the singular value decomposition of the matrix, M.

The matrix, M, can be represented by the product of two vectors, U and V, and a diagonal matrix, W. The diagonal elements of W are the eigenvalues of the matrix, M. If an eigenvalue is zero, then the determinant will be zero and the matrix will be singular. The singular value decomposition (svd) of M is given by:

$$M = U W V^T \quad (4)$$

When this expression for M is substituted into equation 3, the least squares solution to equation 2 becomes:

$$x = V W^{-1} U^T A. \quad (5)$$

Because W is diagonal, then inverse of W is also diagonal and their values are the reciprocals of the corresponding elements of W. If any of the eigenvalues are zero, the inverse will not exist. The standard way around this problem is to replace the inverse of a zero eigenvalue by zero. This is also done for any eigenvalue which is close to zero. Because this method is not the true inverse of the matrix, it is called the pseudoinverse.

The description for the singular value decomposition and the least squares solution to a set of linear equations can be found in standard references such as *Numerical Recipes in C*, W. H. Press, et al., Cambridge University Press, pp. 60–71 (1988)

Once the printer has been calibrated, any halftone dot or halftoning process can be calibrated. The traditional halftone dot consists of several canonical patterns, called template dots. Each template dot is a pattern that can be analyzed for its features. A matrix, M, can be constructed, where each row of the matrix is the set of features for one of the template dot patterns. The size of the matrix will depend on the size of the halftone dot and the desired level of accuracy in determining the correction values. There can be one row in matrix, M, for each unique template dot. If a pseudo random halftoning method such as error diffusion, is being analyzed, then the number of patterns, or gray levels, can be chosen to any degree of accuracy desired.

When the matrix of features M has been determined from the bitmaps for the halftone process, the predicted tone response of the printer can be calculated from equation 2. The tone response is the vector of absorptances, A, which is found by multiplying the matrix M times the already determined vector of printer parameters, x.

An experimental comparison between predicted and measured halftone responses is shown in FIGS. 4 and 5. FIG. 4 shows the response of a write-black printer to two different halftone dots, and FIG. 5 shows the responses for a write-white printer to the same halftone dots. In both figures, the X's record a measurement of a printed halftone patch. The solid lines are the predicted responses of each pattern for that printer, based on the experimentally determined 17 model parameters. The model parameters are the ones shown in Tables 1 and 2. As seen from the Figures, the experimental fits are very good.

TABLE 1

Model parameters for write-black printer.

| Parameter | Value |
| --- | --- |
| $\alpha_1$ | 1.12552186 |
| $\alpha_2$ | 0.78980985 |
| $\alpha_3$ | 0.71490069 |
| $\alpha_4$ | 0.13749903 |
| $\alpha_5$ | −0.40361033 |
| $\alpha_6$ | −0.82786598 |
| $\alpha_7$ | −0.12442105 |
| $\alpha_8$ | −0.07729388 |
| $\alpha_9$ | −0.05469257 |
| $\alpha_{10}$ | −0.10982887 |
| $\alpha_{11}$ | 0.01855857 |
| $\alpha_{12}$ | 0.04173170 |
| $\alpha_{13}$ | −0.61856867 |
| $\alpha_{14}$ | −0.56391735 |
| $\alpha_{15}$ | −0.27138710 |
| $\alpha_{16}$ | 0.42354225 |
| $\alpha_{17}$ | 0.89974495 |

TABLE 2

Model parameters for a write-write printer.

| Parameter | Value |
| --- | --- |
| $\alpha_1$ | 1.37499353 |
| $\alpha_2$ | −0.53369023 |
| $\alpha_3$ | −0.66159965 |
| $\alpha_4$ | 0.13101196 |
| $\alpha_5$ | 0.55148008 |
| $\alpha_6$ | 0.19801771 |
| $\alpha_7$ | −0.38199814 |
| $\alpha_8$ | 0.05415009 |
| $\alpha_9$ | 0.03907872 |
| $\alpha_{10}$ | 0.08056423 |
| $\alpha_{11}$ | 0.00635296 |
| $\alpha_{12}$ | −0.01663402 |
| $\alpha_{13}$ | 0.68023182 |
| $\alpha_{14}$ | 0.77010379 |
| $\alpha_{15}$ | −0.51797838 |
| $\alpha_{16}$ | −0.61696978 |
| $\alpha_{17}$ | −0.73965247 |

Referring now to FIGS. 6A and 6B, a printing system is shown in which the present invention may find use. Scanner 100 scans documents for the derivation of image information therefrom, and commonly provides as an output a multibit digital image signal $I_G(x,y)$ representing grays in the document (gray pixels). Common scanners include the scanner associated with the Xerox DocuTech Printing System, the Xerox 5775 Digital Color Copier, and the Pixelcraft 7650 or 7650C products. In the calibration process that will be described, the scanner operates in a standard mode, to scan a test pattern on a calibration document. Alternatively, scanner 100 could be replaced with a densitometer.

In a calibration mode of operation, scanner 100 scans output prints from printer 102. Printer 102 is controlled to print a calibration print, generated at a pattern generator 104 associated with the printer. Conveniently, the pattern generator might take the form of a memory storing a bitmap image of the test pattern of FIG. 3, or another pattern meeting the calibration system requirements. The generated document 106 is scanned by scanner 100, and the reflectance values derived during the scan are stored in a memory 108 (here indicated as "stored reflectance values"). Upon derivation, the values are directed to a computational system for calculation of the least square fit function 110, such as a computer or workstation or the like, controlled to apply an appropriate non-linear regression to the derived reflectance values, as previously described.

As a second input to the least squares fit function 110, model features, which are derived from the previously generated test patterns, are also directed to the function 110. Said model features are determined from analysis of the stored test patterns by the pattern analysis 152. The output of the calculation in the least squares fit function 110 are the model parameters.

Examples of two sets of model parameters are shown in Tables 1 and 2. They are for a write-black and a write-white printer. The range of values for the parameters is on the order of unity. No parameters are near zero, but depending on their nature, they can be either positive and negative. Note also that the horizontal and vertical sides parameters are different, indicating that the process direction is important in the prediction process, With specific reference now to FIG. 6B, the model parameters will be used to derive the expected TRC curve for a halftone dot. A matrix analysis function 150, which could conveniently be an appropriately programmed computer or workstation or the like, received the set of calculated parameters for a selected printer, such as printer 102. Matrix analysis also receives a pattern analysis from analysis 152 of a selected halftone dot of interest detailing the changing structure of the halftone dot as it changes in intensity. These two multiple variable sets are used in calculating expected TRC for the dot. As previously described, matrix analysis 150 typically takes the form of a matrix multiplication, multiplying the features defined by the halftone dot function, by the printer model parameters (as in equation 2)

In summary, it has been shown that a printer can be calibrated independently of any given halftone dot structure. From this calibration, the printer response to any halftone dot can be predicted with only the knowledge of the halftone dot structure and the model parameters describing the printer calibration. The use of this invention will greatly simplify the black and white, halftone calibration process.

While the parameters were derived from a black and white area-coverage model, the invention applies to calibration of color images on a color printer. The term gray images, therefore, also refers to individual color separations and the term gray reproduction scheme refers to a halftoning algorithm applied to an individual color separation. In a color calibration, individual separations are first independently calibrated. In a second step, the halftone dots or halftoning algorithms are corrected for color balance and unwanted overlapping spectral absorptions. This invention can be used to perform the first independent calibration of each color separation, which will save the repetition of this step for each individual halftone dot or halftoning algorithm.

Another problem in halftone calibration is the noise or unrepeatability of measurements of halftone dots. As printer resolution increases and halftone dots can have many more levels, the variation in reading a single level can easily be larger than the actual difference between different levels. To overcome this problem, a rigorous calibration requires multiple readings of each halftone level taken from different printouts. In practice this is seldom done. Instead, an assumption is made that the engine characteristic can be described with a smooth curve. Instead of measuring all of the possible halftone levels, redundant measurements are made of some of the levels and a smoothly varying TRC is generated.

This assumption is known to be invalid for a raster-based electronic imaging system. Dot growth in the fast-scan direction can have a much different contribution to optical density than growth in the slow-scan direction, especially with the first pixel added on a new scan line. An actual engine characteristic will have fine detail and changing curvature, and the corresponding TRC should have matching detail and curvature.

This invention solves this problem in that it is capable of predicting many more levels than the number of measurements required to establish the model parameter values. The redundant measurements can be better invested in fitting the model, and a more accurate and detailed calibration will result.

The embodiment described is a general one. If more a priori information about the printer is available, the measurement parameters may be reduced. For example, if the printer does not have any process dependency, the horizontal and vertical sides can be combined into a single sided parameter, reducing total parameters to 13. If the printer is known to be write black or write white, a variation of the above mentioned features can be used instead of the full model with similar results and using only 13 parameters. Once again, if there is no process direction dependency and the printer is known to be write black or write white, the model can be reduced to only 11 parameters.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. A calibration system, for calibrating a printer response to gray images directed thereto, including
   a test pattern, stored in a memory, providing a plurality of sample samples of combinations of printed spots, printable on a media by said printer;
   a gray measuring device, to derive a gray measurement of said samples of printed spots;
   a calibration processor:
      correlating said gray measurement with a combination of spots having a particular spatial relationship, and deriving parameters describing said printer response to said combination, and
      generating from said parameters at least one non-linear gray image correction function, said gray image correction function including a set of correction values selected in accordance with said described printer response; and
      a calibration memory, storing said generated gray image correction; and
   means to apply said gray image correction stored in said calibration memory to calibrate a printer using a halftone pattern.

2. The system as described in claim 1, where said combinations of printed spots includes spots with a plurality of different spatial relationships with respect to one another.

3. The system as described in claim 1, wherein said calibration processor is a standard programmable computer.

4. The system as described in claim 1, wherein said gray measuring device is a scanner.

5. The system as described in claim 1, wherein said gray measuring device is a densitometer.

6. The system as described in claim 1, wherein said gray measuring device is a colorimeter.

7. The system as described in claim 1, wherein said calibration system is applied to a color separation.

8. A method of calibrating a printer response including the steps of:
   printing a test pattern illustrating printer response to a number of spot spatial variations;
   measuring the printer response for each spatial variation of spots and generating a set of printer parameters from said measurements;
   defining a gray reproduction process as a function of characteristics of the process and the printer parameters, and generating a set of image correction values, responsive to the definition;
   adjusting the printer response to the gray reproduction process, in accordance with the image correction values at the printer;
   printing images requiring halftone processing with the defined gray reproduction process and correcting each halftone used in accordance with the defined gray reproduction process.

9. The system as described in claim 8, wherein said calibration system is applied to a color separation.

10. A calibration system, for calibrating a printer response to halftone images directed thereto, including
    a test pattern, stored in a memory, providing a plurality of samples of combinations of printed spots, printable on a medium by said printer;
    a scanner, adapted to scanning the media, to derive an intensity measurement of said samples of printed spots;
    a calibration processor:
       correlating said intensity measurement with a particular combination of spots, and deriving a set of parameters describing said printer response to said particular combination, and
       generating from said parameters at least one non-linear image correction function predicted for a given halftone dot and parameter set, said image correction correcting the printer response to said halftone dot; and
    a calibration memory, storing said generated image correction.

11. The system as described in claim 10, wherein said calibration system is applied to a color separation.

* * * * *